(12) United States Patent
Bertolina

(10) Patent No.: US 11,877,688 B2
(45) Date of Patent: Jan. 23, 2024

(54) BREWING DEVICE FOR PRODUCING A BEVERAGE

(71) Applicant: SGL ITALIA S.R.L. CON UNICO SOCIO, Turin (IT)

(72) Inventor: Andrea Bertolina, Castelnuovo Calcea (IT)

(73) Assignee: SGL ITALIA S.R.L. CON UNICO SOCIO, Turin (IT)

(*) Notice: Subject to any disclaimer, the term of this patent is extended or adjusted under 35 U.S.C. 154(b) by 693 days.

(21) Appl. No.: 16/756,400

(22) PCT Filed: Oct. 19, 2018

(86) PCT No.: PCT/IB2018/058136
§ 371 (c)(1),
(2) Date: Apr. 15, 2020

(87) PCT Pub. No.: WO2019/077566
PCT Pub. Date: Apr. 25, 2019

(65) Prior Publication Data
US 2021/0030191 A1    Feb. 4, 2021

(30) Foreign Application Priority Data

Oct. 19, 2017 (EP) .................................. 17197376
Jan. 19, 2018 (IT) ....................... 102018000001512

(51) Int. Cl.
*A47J 31/06*      (2006.01)
*A47J 31/36*      (2006.01)

(52) U.S. Cl.
CPC ....... *A47J 31/0647* (2013.01); *A47J 31/3633* (2013.01); *A47J 31/3638* (2013.01); *A47J 31/3676* (2013.01)

(58) Field of Classification Search
None
See application file for complete search history.

(56) References Cited

U.S. PATENT DOCUMENTS

| | | | |
|---|---|---|---|
| 8,425,963 B2* | 4/2013 | Ryser | A47J 31/3638 426/77 |
| 8,844,428 B2* | 9/2014 | Kollep | A47J 31/3633 99/302 R |

(Continued)

FOREIGN PATENT DOCUMENTS

| | | |
|---|---|---|
| EP | 2103236 A1 | 9/2009 |
| EP | 2425753 A1 | 3/2012 |

(Continued)

OTHER PUBLICATIONS

International Preliminary Report on Patentability for International Application No. PCT/IB2018/058136 dated Jan. 28, 2020.

(Continued)

*Primary Examiner* — Nathaniel E Wiehe
*Assistant Examiner* — Theodore J Evangelista
(74) *Attorney, Agent, or Firm* — Dorsey & Whitney LLP

(57) ABSTRACT

A brewing device for producing a beverage from two differently sized capsules; the brewing device comprising two parts opposite and mutually movable between an open or loading position of a capsule and a closing or brewing position, one of the two parts defined by a cup-shaped body formed by a first portion and by a second portion defining between them a seat designed to receive the capsule during a movement of the cup-shaped body towards the closing position; the second portion designed to slide with respect to the first portion between a smaller seat position and a larger seat position due to the interaction with the larger capsule during the movement of the cup-shaped body towards the closing position; and a blocking device provided to define, in the closing position, a constraint to keep the second portion still only when the second portion is in the normal smaller seat position.

6 Claims, 9 Drawing Sheets

(56) References Cited

U.S. PATENT DOCUMENTS

| | | | |
|---|---|---|---|
| 2005/0129809 A1* | 6/2005 | Cortese | A47J 31/3633 426/77 |
| 2016/0309946 A1* | 10/2016 | Gunstone | A47J 31/3623 |
| 2017/0013993 A1* | 1/2017 | Bonacci | A47J 31/0647 |

FOREIGN PATENT DOCUMENTS

| | | |
|---|---|---|
| EP | 2906092 B1 | 8/2016 |
| EP | 2908706 B1 | 12/2016 |
| WO | 2013150480 A1 | 10/2013 |
| WO | 2014056810 A1 | 4/2014 |
| WO | 2014060370 A1 | 4/2014 |
| WO | 2014096120 A1 | 6/2014 |
| WO | 2015155145 A1 | 10/2015 |
| WO | 2018026274 A1 | 2/2018 |

OTHER PUBLICATIONS

International Search Report and Written Opinion from International Application No. PCT/IB2018/058136 dated Mar. 19, 2019.
Second Written Opinion from International Application No. PCT/IB2018/058136 dated Oct. 18, 2019.

* cited by examiner

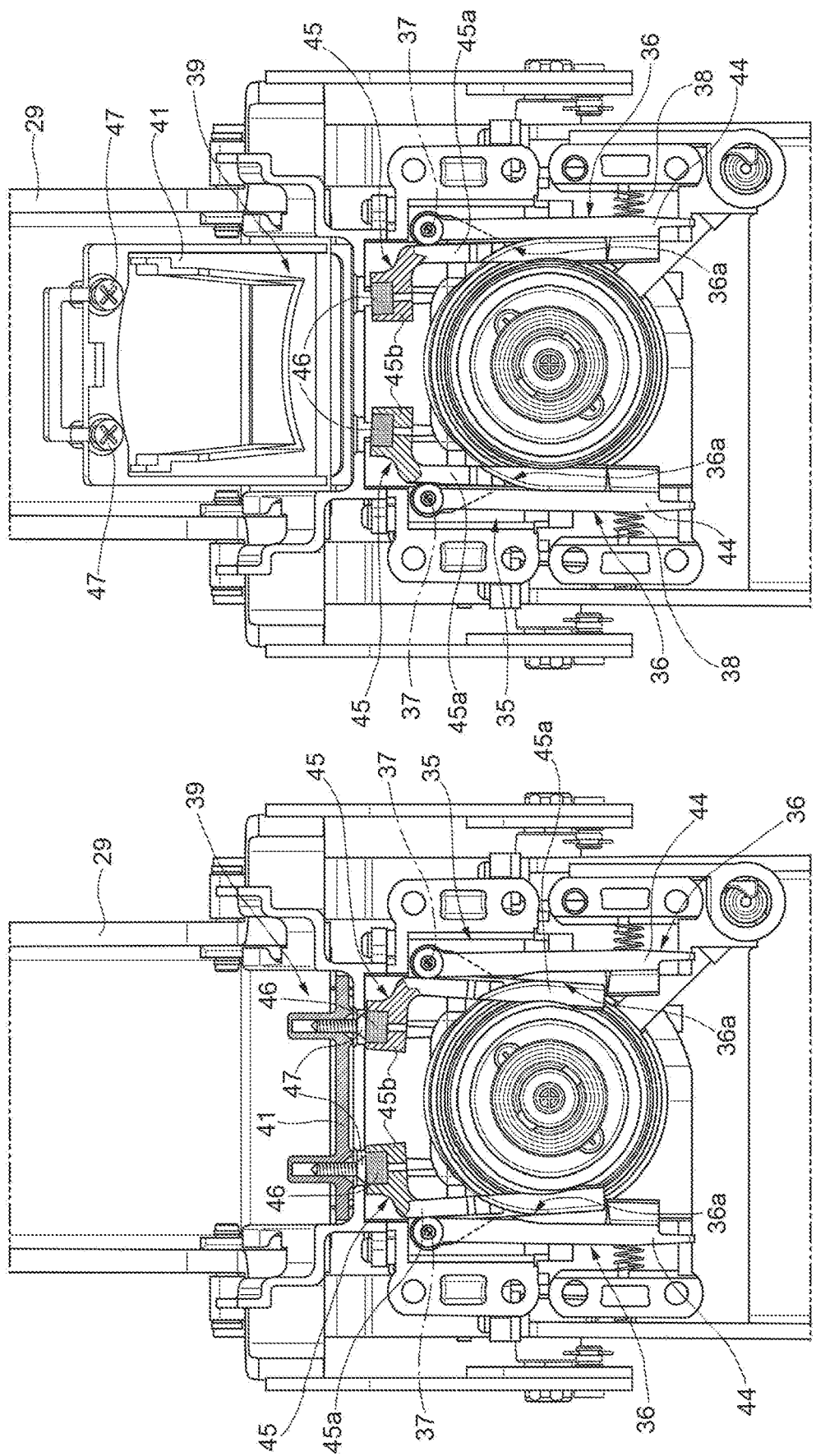

BREWING DEVICE FOR PRODUCING A BEVERAGE

CROSS-REFERENCE TO RELATED APPLICATIONS

This patent application claims priority from European patent application No. 17197376.1 filed on 19 Oct. 2017 and from Italian Patent Application No. 102018000001512 filed on 19 Jan. 2018, the entire disclosure of which is incorporated herein by reference.

TECHNICAL FIELD OF THE INVENTION

The present invention relates to a brewing device for producing a beverage from disposable capsules containing a dose of brewable or soluble material, e.g. coffee powder, tea, chocolate, milk, etc.

In particular, the present invention relates to a brewing device suitable for producing a beverage from two differently sized capsules and comprising two parts that are mutually movable between an open position, in which they define a loading zone adapted to accommodate a new capsule, and a closing position, in which the capsule is clamped between the two parts and a dose of infusion fluid can be injected into the capsule for producing the beverage.

STATE OF THE ART

Normally, in known brewing devices accommodating two differently sized capsules, one of the two aforesaid parts is defined by a cup-shaped body, which is sized to at least partially accommodate the capsule and is formed by two elements movable one with respect to the other in order to adapt the inner space of the cup-shaped body designed to contain the capsule to the size of the capsule accommodated.

Brewing devices of this type are known, for example, from EP 2906092B, WO 2014/56810 and EP 2908706B.

In these brewing devices, the displacement of the aforesaid two elements defining the cup-shaped body normally takes place by means of a dedicated motorized actuator, controlled by sophisticated electronic control systems.

Moreover, the brewing devices of the aforesaid type usually comprise a loading device suitable to receive a capsule from above and to hold it in a position more or less coaxial with the longitudinal axis of the brewing device.

It is known the use of a loading device comprising a gripper device provided with two jaws, symmetrically arranged on opposite sides of the longitudinal axis of the device and each provided with a curved groove defining with the other groove an upwardly open seat adapted to accommodate the flange of the capsule to hold it in a loading position. The jaws are hinged on respective stationary pins to swing, normally against the action of an elastic member, between a closing position, in which they support the capsule, and an open position, in which they are spread apart to allow a cup-shaped body carried by one of the two parts of the brewing device to be inserted between the jaws and to accommodate the capsule, thus tight-sealing it with respect to the other part of the brewing device.

Brewing devices provided with loading devices of this type are known, for example, from WO 2013/150480, EP 2425753 and EP 2103236.

OBJECT AND SUMMARY OF THE INVENTION

The object of the present invention is to provide a brewing device that is capable to receive capsules of two different sizes and represents a simple and inexpensive alternative to the aforesaid known solutions.

According to the present invention, there is provided a brewing device according to claim 1 and, preferably, to any one of the subsequent claims directly or indirectly dependent from claim 1.

BRIEF DESCRIPTION OF THE DRAWINGS

The invention will now be described with reference to the accompanying drawings showing a non-limiting embodiment, in which:

FIG. 11 is a section along line XI-XI of FIG. 2;

FIG. 12 is a section along line XII-XII of FIG. 7;

DETAILED DESCRIPTION OF PREFERRED EMBODIMENTS OF THE INVENTION

Figure 1:
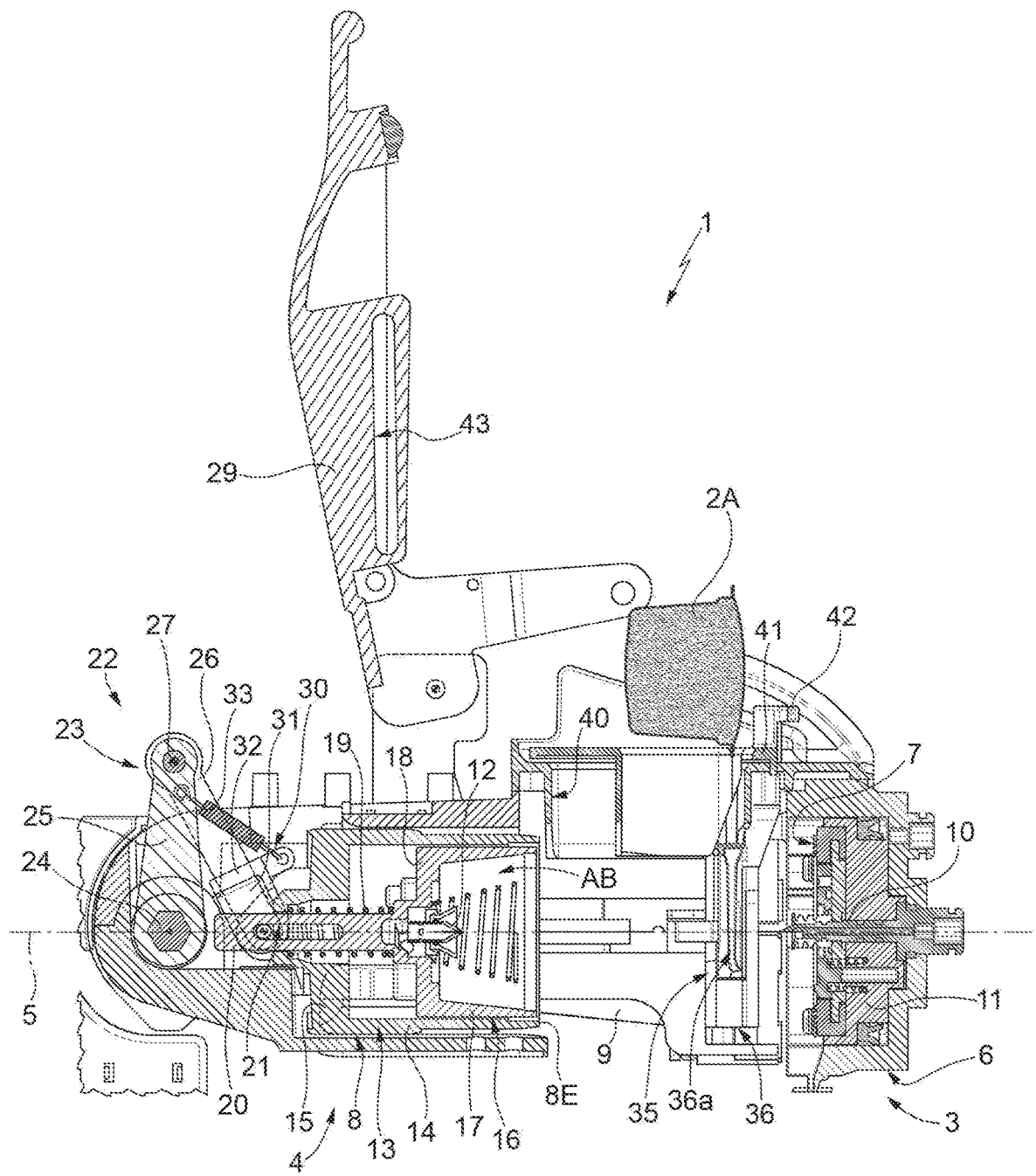
FIG. 1 shows, in a longitudinal section and with parts removed for clarity, a preferred embodiment of the brewing device of the present invention, arranged in a capsule loading configuration.
Figure 2:
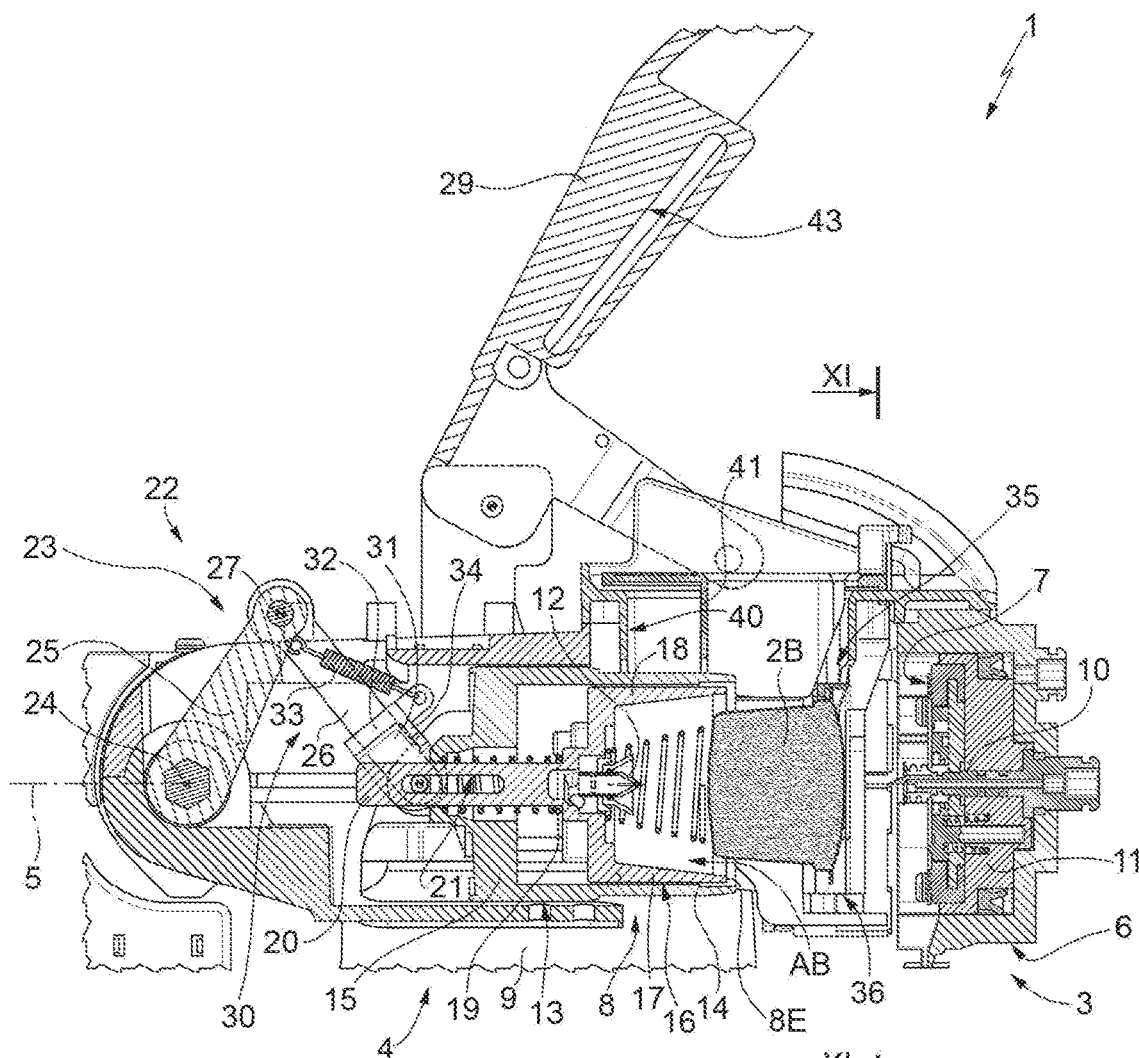
FIGS. 2 to 5 show the brewing device of FIG. 1 in further different operating configurations.
Figure 3:
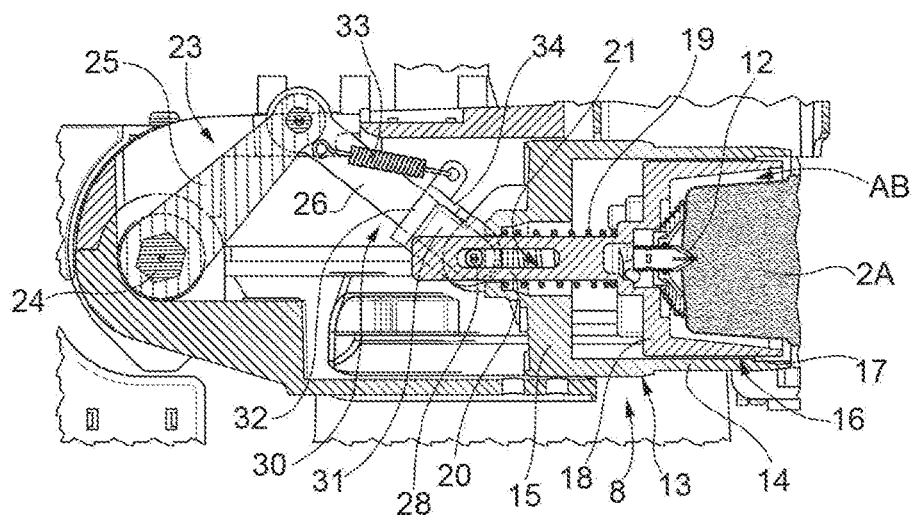

In FIG. 1, reference numeral 1 references as a whole a brewing device for producing a beverage by injection of an infusion fluid, typically pressurized hot water, into a disposable capsule 2 containing a dose of brewable or soluble material, e.g. coffee, tea, chocolate, milk, etc.

In particular, the brewing device 1 is configured to automatically perform a brewing process starting from capsules 2 of the known type comprising a cup-shaped body and a cover, tight-sealed to an outer annular flange of the cup-shaped body and consisting of a perforable membrane.

Preferably, the cup-shaped body is made of impermeable plastic material, preferably by thermoforming, and the perforable membrane is formed by a single or multi-layer sheet of plastic and/or metal material.

Figures 4, 5:
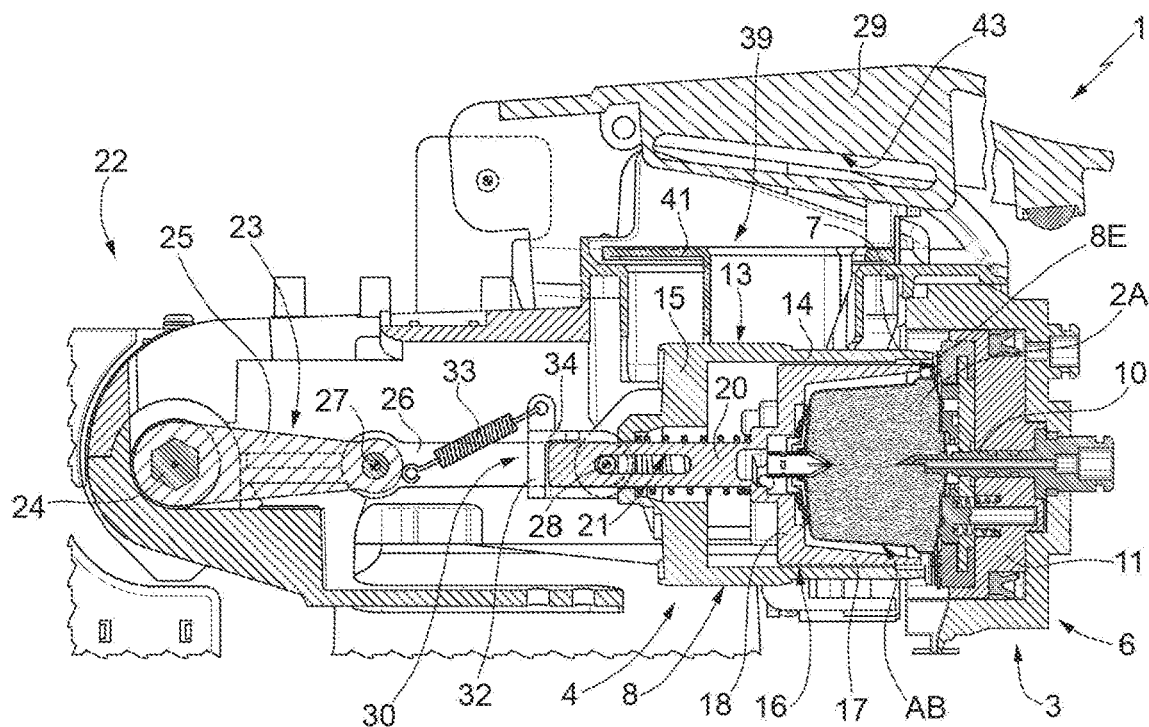
Figure 6:
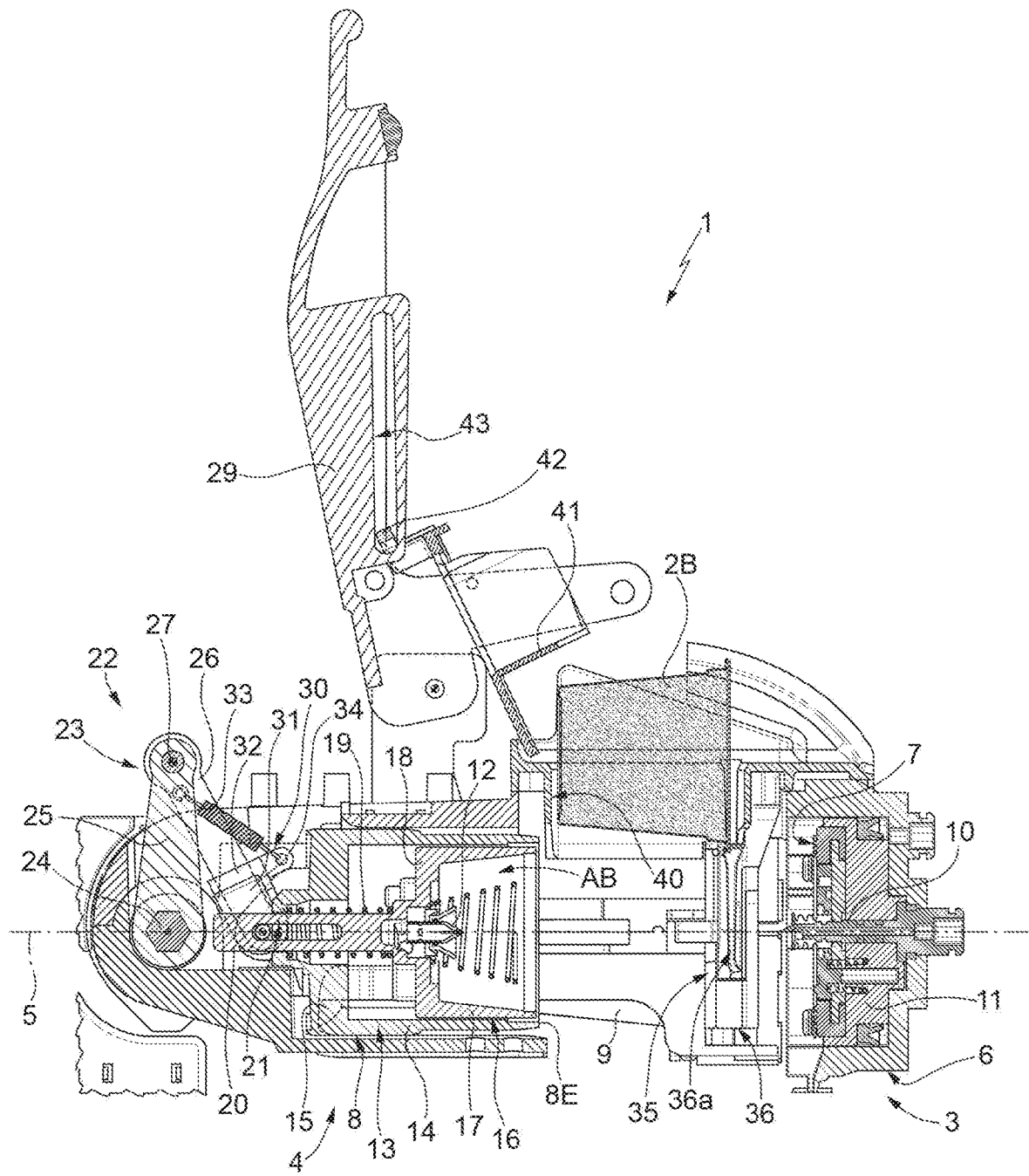
FIG. 6 shows the brewing device of FIG. 1 arranged in a loading configuration when a capsule of bigger size is used.
Figure 7:
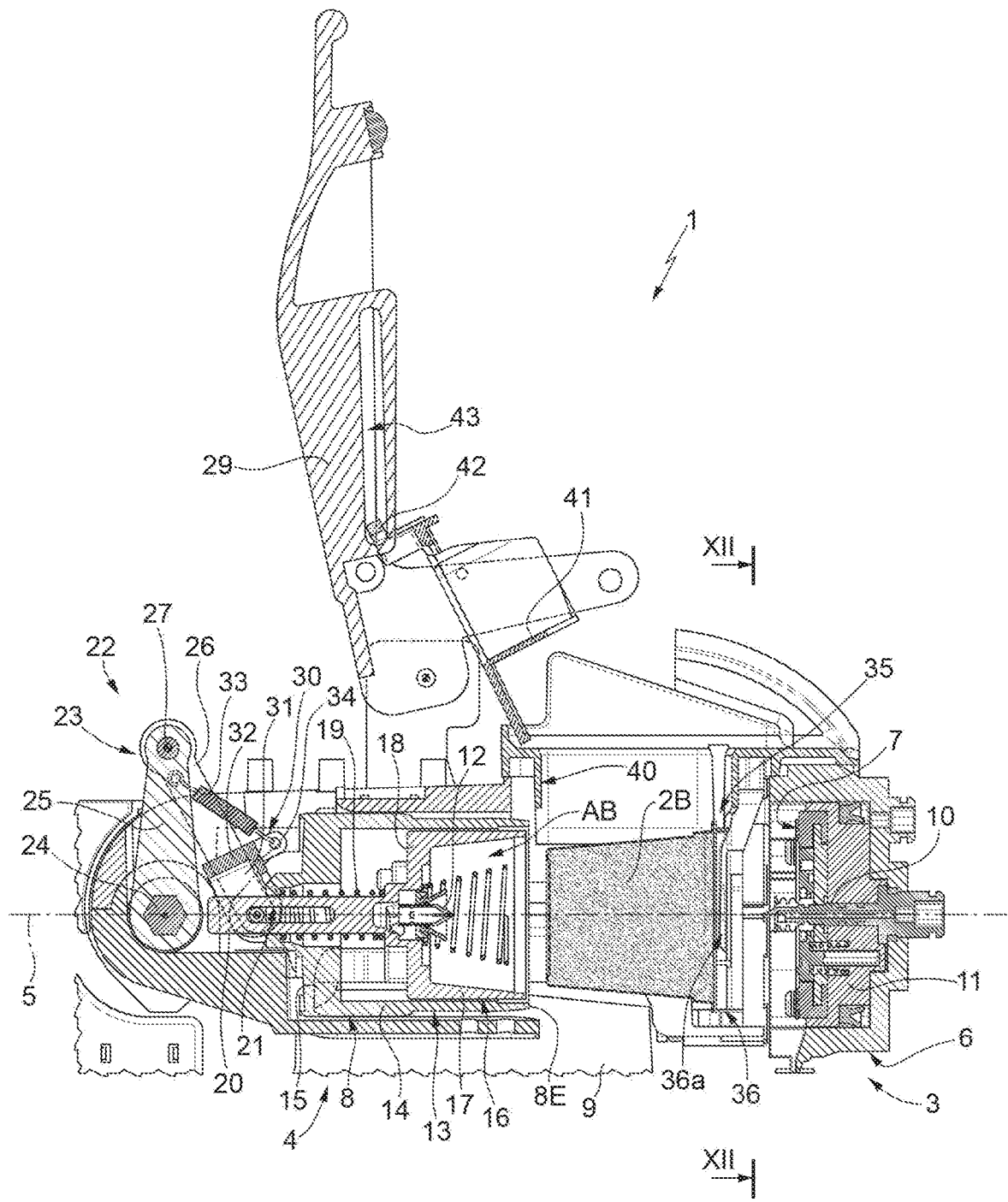
FIGS. 7 to 10 show the brewing device of FIG. 6 in further different operating configurations.
Figure 8:
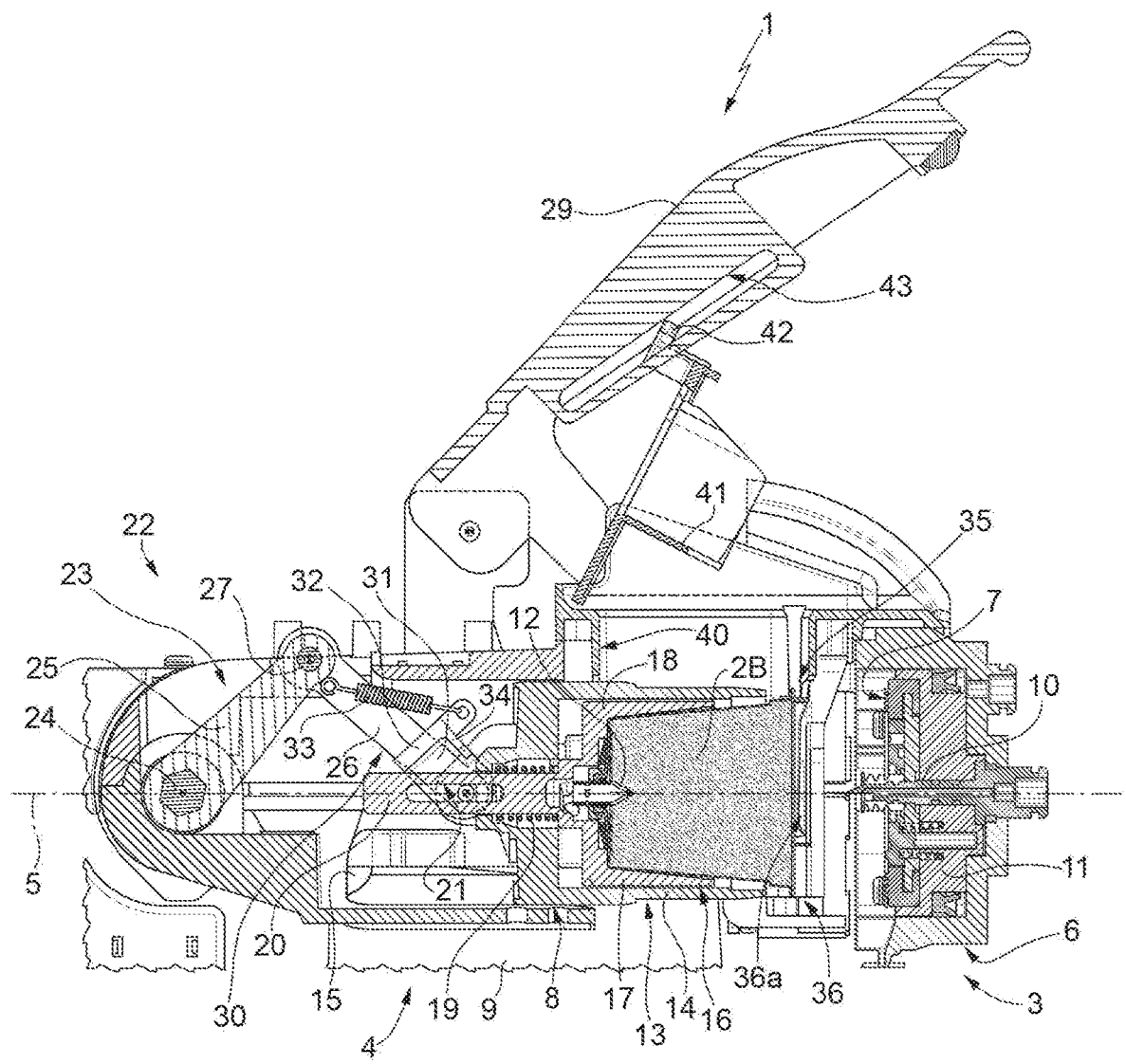
Figure 9:
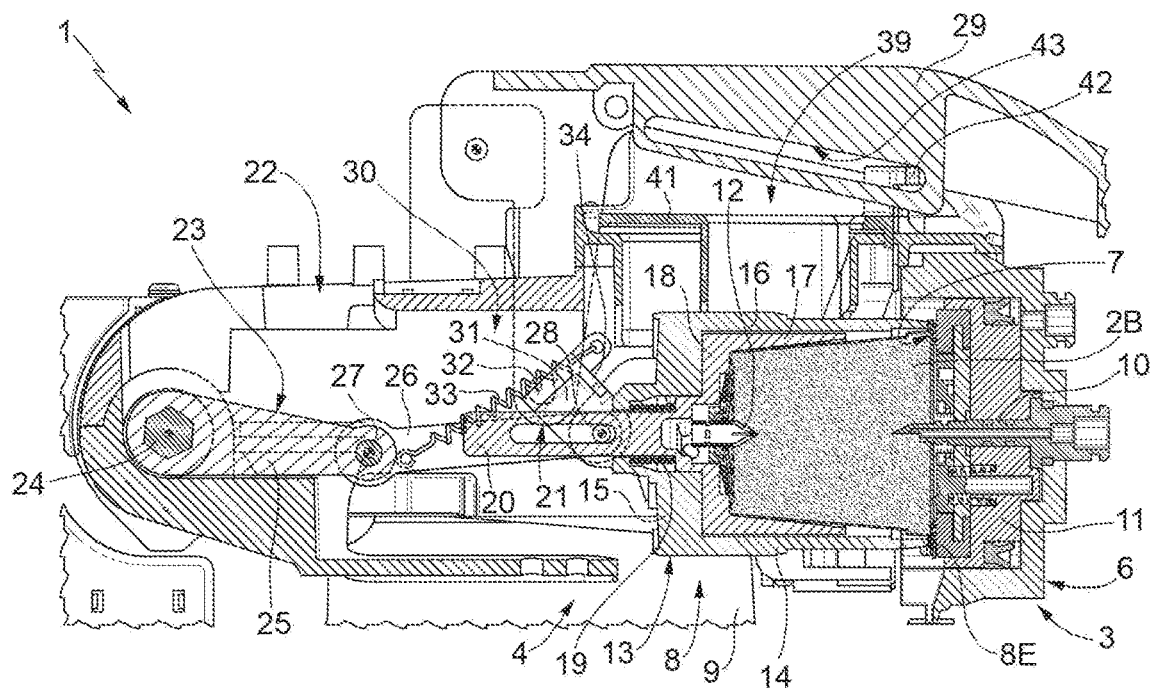
Figure 10:
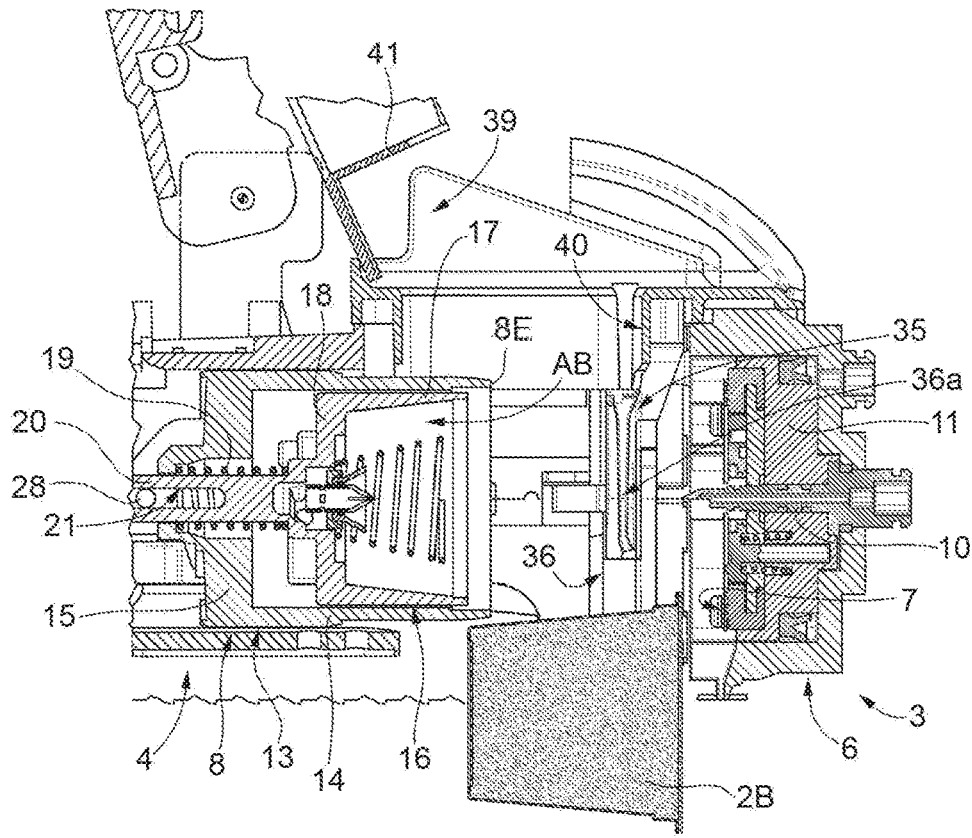

According to the attached Figures, the brewing device 1 comprises two parts 3 and 4 aligned along a longitudinal axis 5 and mutually movable between an open position (FIGS. 1 and 6), in which the parts 3 and 4 are spaced apart and define therebetween a space for loading a capsule 2, and a closing position (FIGS. 4 and 9), in which the parts 3 and 4 are tightened one against the other and define between them an infusion chamber enclosing the capsule 2.

One of the two parts of the brewing device 1, indicated by reference numeral 3 in the accompanying Figures, comprises a transverse body 6, which is arranged at an axial end of the brewing device and is bounded, on the side facing the other part of the brewing device 1, by a flat surface 7 transverse to the longitudinal axis 5. The other part of the brewing device 1, indicated by reference numeral 4 in the accompanying Figures, comprises a cup-shaped body 8, which is coaxial with the longitudinal axis 5, is oriented with its end opening towards the transverse body 6 and is mounted on a frame 9 of the brewing device 1 to move along the longitudinal axis 5 between a retracted position, which corresponds to the open position of the brewing device 1, and an advanced position, in which the brewing device 1 is or is not in the aforementioned closing position, as better explained below.

During the displacement from the retracted position to the advanced position, the cup-shaped body 8 engages the capsule 2 that has been previously loaded between the parts 3 and 4 with its symmetry axis coaxial with the longitudinal axis 5 and with the perforable membrane facing part 3. The capsule 2 axially enters the cup-shaped body 8 until the flange of the capsule 2 engages a free edge 8E of the cup-shaped body 8; from this point onwards, the cup-shaped body 8 moves, together with the capsule 2, towards the transverse body 6 until the perforable membrane of the capsule 2 is brought against the flat surface 7 of the transverse body 6.

According to the preferred embodiment shown in the accompanying Figures, the transverse body 6 carries the frame 9 (e.g., an injection assembly) of an infusion fluid, normally pressurized hot water. The frame 9 (e.g., the injection assembly) comprises at least one injection needle 10, which is connected to an infusion fluid supply circuit (not shown) and is arranged on the transverse body 6 to pierce the perforable membrane of the capsule 2 when the cup-shaped body 8 reaches the advanced position.

The injection needle 10 extends through a movable body 11, which is part of the transverse body 6, is preferably, but not necessarily, coaxial with the longitudinal axis 5 and is bounded, on the side facing the cup-shaped body 8, by the aforementioned flat surface 7 of the transverse body 6. The movable body 11 constitutes the movable part of a hydraulic cylinder and for this purpose is slidably mounted along the longitudinal axis inside a cavity of the transverse body 6. In use, when the cup-shaped body 8 is in the advanced position and keeps the flange of the capsule 2 against the flat surface 7, an operating fluid is fed between the movable body 11 and the bottom of the cavity to move the movable body 11 towards the cup-shaped body 8, thus tight-sealing the flange of the capsule 2 between the flat surface 7 and the free edge 8E of the cup-shaped body 8 and bringing the brewing device 1 into said closing position.

According to an embodiment not shown, the transverse body 6 is devoid of the movable body 11 and the injection needle 10 extends through a stationary portion of the transverse body 6 delimited by the aforementioned flat surface 7 with respect to the cup-shaped body 8. In this case, the tightness on the flange of the capsule 2 is only guaranteed by the thrust of the cup-shaped body 8 against the transverse body 6.

According to a further embodiment not shown, the flat surface 7 of the transverse body 6 is formed on a plate, which is mounted by means of springs on the transverse body 6 to move, during operation, under the thrust of the cup-shaped body 8, from a covering position, in which the plate covers the free end of the injection needle 10, to an injection position, in which the plate is pressed against the transverse body 6 and the injection needle extends through an opening of the plate to pierce the capsule 2.

In the case where, as in the shown example, the transverse body 6 brings an injection assembly, the cup-shaped body 8 carries an extraction assembly comprising at least one extraction needle 12 and one discharge channel for beverage outflow.

According to an embodiment not shown, the injection assembly and the extraction assembly can be reversed, i.e. the injection needle 10 can be carried by the cup-shaped body 8 and the extraction needle 12 can be carried by the transverse body 6. However, also in this embodiment, what has been previously described and what will be later explained about the structural features of the transverse body 6 and of the cup-shaped body 8 remains conceptually valid.

According to the attached Figures, the brewing device 1 is designed to produce a beverage starting from differently sized capsules 2, which will be indicated for clarity as capsule 2A (FIGS. 1 to 5) and capsule 2B (FIGS. 6 to 10). In particular, the capsule 2A has a shorter height, measured along the longitudinal axis of the capsule, than the capsule 2B.

Preferably, moreover, the diameter of the flange of the capsule 2A is smaller than the diameter of the flange of the capsule 2B.

In order to receive both types of capsule 2, the cup-shaped body 8 comprises two cup-shaped elements arranged one inside the other and mutually movable, thus defining on a case-by-case basis a seat AB having a size adequate to contain the capsule 2A or 2B to be extracted.

One of the two cup-shaped elements is defined by an outer cup 13, whose concavity faces the transverse body 6 and which comprises a side wall 14 coaxial with the longitudinal axis 5 and a bottom wall 15 transverse to the longitudinal axis 5.

The other cup-shaped element is defined by an inner cup 16, which is arranged inside the outer cup 13 with its concavity facing the transverse body 6 and is defined by a side wall 17 slidingly coupled to the side wall 14 of the outer cup 13 and by a bottom wall 18 transverse to the longitudinal axis 5.

The free edge of the outer cup 13 facing the transverse body 6 is formed by the aforementioned free edge 8E of the cup-shaped body 8, which, as already stated, is able to compress the flange of the capsule 2 against the flat surface 7 of the transverse body 6 when the brewing device 1 moves into the closing position.

The inner cup 16 is mounted to slide inside the outer cup 13 between an extracted position, in which the bottom wall 18 of the inner cup 16 is spaced apart from the bottom wall 15 of the outer cup 13 and the two cups define therebetween a "smaller" seat AB, and a retracted position, in which the bottom wall 15 of the inner cup 16 contacts the bottom wall 18 of the outer cup 13 and the two cups define therebetween a "larger" seat AB.

The inner cup 16 is normally maintained in the advanced position by an elastic member 19, for example a helical spring, arranged between the bottom wall 15 of the inner cup 16 and the bottom wall 18 of the outer cup 13.

The seat AB defined by the inner cup 16 and by the outer cup 13 has a depth that is equal to the distance between the bottom of the inner cup 16 and the free edge 8E of the outer cup 13. According to what previously stated, this distance is variable and dependent on the position, extracted or retracted, of the inner cup 16 with respect to the outer cup 13. In particular, the inner cup 16 and the outer cup 13 are sized so that, when the inner cup 16 is in the extracted position, the depth of the seat AB is approximately equal to the height of the capsule 2A and, in the retracted position, is approximately equal to the height of the capsule 2B.

The bottom wall 18 of the inner cup 16 has a preferably cylindrical appendix 20, which, starting from the bottom wall 18, extends parallel to the longitudinal axis 5, through and beyond the bottom wall 15 of the outer cup 13, and presents centrally an elongated slit 21 parallel to the longitudinal axis 5.

The brewing device 1 further comprises an actuator 22 for moving the cup-shaped body 8 to and from the transverse body 6.

The actuator 22 comprises a linkage 23 arranged between a stationary pin 24 integral with the frame 9 and the bottom wall 15 of the outer cup 13.

The linkage 23 comprises a crank 25 fitted on the pin 24 and a pair of parallel connecting rods 26 (only one of which is visible in the attached Figures) having an end hinged to the free end of the crank 25 by means of a pin 27 and the opposite end hinged to the bottom wall 15 of the outer cup 13 by means of a pin 28, which is transverse to the longitudinal axis 5 and rotatably engages two holes formed in respective brackets integral with the bottom wall 15. According to an embodiment (not shown), there is a single connecting rod 26 and, consequently, there is a single bracket carried by, and axially projecting from, the outer cup 13.

Moreover, the pin 28 rotatably and slidingly engages the slit 21 of the appendix 20 to define, together with the appendix 20, a linear and anti-rotational guide for the inner cup 16.

The stationary pin 24 on which the crank 25 is hinged is operable by an electric operating device or, as in the shown example, by a manual operating lever, which is formed by the cover 29 of the brewing device 1 and is connected to the pin 24 by means of a plurality of connecting rods (not shown).

Finally, the brewing device 1 comprises a blocking device 30, whose function is axially blocking the inner cup 16 in its extracted position when the seat houses a capsule 2A, i.e. the capsule with a shorter height, and the brewing device 1 is in the closing position. The axial block of the inner cup 16 realized by the blocking device 30 is necessary to prevent the axial thrust imparted to the capsule 2A by the pressurized fluid injected therein from moving back the inner cup 16, thus causing a sudden unwanted extension of the seat AB that houses the capsule 2A.

The blocking device 30 is configured so that it does not require a dedicated actuation device to become operative, but is automatically activated when the seat AB houses a capsule 2A and is not activated when the seat AB houses a capsule 2B.

In particular, the blocking device 30 is normally arranged in an operative or blocking configuration, which so that, if maintained, causes the blocking device 30 to engage, when the brewing device 1 is in the closing position, the inner cup 16 to prevent the backward movement of the latter towards the bottom of the outer cup 13. In particular, in this blocking configuration and in the closing position of the brewing device 1, the blocking device 30 defines an abutment arranged in contact with the free distal end of the appendix 20 of the inner cup 16.

The blocking device is configured to move from the normal blocking configuration to a disengaged configuration in response to the backward movement of the inner cup 16 when a capsule 2B enters the inner cup 16 while closing the brewing device 1.

In particular, the blocking device 30 is connected to the linkage 23 so as to move during the advancement of the cup-shaped body 8 towards the transverse body 6 through the path that the appendix 20 of the inner cup 16 follows when, and only when, the inner cup 16 moves back towards the bottom of the outer cup 13.

Therefore, if a capsule 2A is used, when closing the brewing device 1 the inner cup 16 does not move back and the blocking device 30 is free to move through said path until stopping, when the cup-shaped body 8 is in the advanced position, in the aforementioned blocking position, where the blocking device 30 engages the distal end of the appendix 20, thus defining said axial abutment.

If, on the other hand, a capsule 2B is used, the inner cup 16 is forced to move back during the advancement of the cup-shaped body 8 and, consequently, the appendix 20 moves back along said path. Since, as previously stated, the blocking device 30 is connected to the linkage 23 so as to move through the path of the appendix 20 during the extension of the connecting rods 26, if this path is already occupied by the retracted appendix 20, the advancement of the blocking device 30 is prevented and the blocking device 30 is forced to move from the normal blocking configuration to the disengaged configuration.

Therefore, when using a capsule 2B, the blocking device 30 does not define an axial abutment for the inner cup 16, as it occurs when using a capsule 2A, and, consequently, does not perform any function as contrasting element against the thrust forces imparted to the inner cup 16 during the injection of the pressurized fluid. However, in this case this function is performed by the outer cup 13, since the cups are sized so that, when a capsule 2B is completely inserted into the cup-shaped body 8, the bottom wall 18 of the inner cup 16 abuts against the bottom wall 15 of the outer cup 13.

According to the preferred embodiment shown in the attached Figures, the blocking device 30 is hinged on the pin 28 between the two connecting rods 26 and comprises:

- two side walls 31, each of which is arranged between a connecting rod 26 and the appendix 20 of the inner cup 16 and has a hole slidably engaged by the pin 28;
- a transverse wall 32, which connects the two side walls 31 and defines, when the blocking device 30 is inserted and the brewing device 1 is in the closing position, said axial abutment configured to engage the free distal end of the appendix 20;
- an elastic retention and return element, preferably two springs 33 extending between the blocking device 30 and the connecting rods 26 adapted to normally maintained the blocking device 30 in the blocking configuration, in which each side wall 31 extends along, and in front of, a corresponding connecting rod 26 and the transverse wall 32 is arranged between the connecting rods 26 and transversely extends between the two connecting rods 26.

The blocking device 30 further comprises an abutment element to keep the blocking device 30 stable when it is arranged in the blocking configuration. The abutment element is preferably defined by two projections 34, each of which is carried by a respective side wall 31 and, in the blocking configuration, is coupled to an upper edge of a respective connecting rod to prevent the blocking device 30 from rotating around the pin 28 under the thrust of the springs 33.

FIGS. 1-5 show the brewing device 1 when a capsule 2A is used, while FIGS. 6-10 show the brewing device 1 when a capsule 2B is used.

As shown in FIGS. 11 and 12, the brewing device 1 is further provided with a retaining device 35, which comprises two jaws 36 hinged on respective stationary pins 37 to support both transversely and axially the capsule 2 in a loading position interposed between the cup-shaped body 8 and the transverse body 6, and to allow, at the end of the beverage dispensing process, the axial extraction of the capsule 2 from the cup-shaped body 8 with consequent expulsion by gravity of the capsule 2.

In particular, the jaws 36 are rotatably mounted about the pins 37 and against the action of respective elastic elements (e.g., springs 38) between a closed or loading configuration (FIGS. 2, 7, 11 and 12), in which they engage the flange of the capsule 2 to support this latter arranged with its perforable membrane facing the transverse body 6, and an open or disengaged configuration, in which the jaws 36 are spaced apart by the cup-shaped body 8, which, during the closing phase of the brewing device 1, advances between the jaws 36 to determine the insertion of the capsule 2 into the seat AB, and, when the brewing device 1 is in the closing position, pushes the flange of the capsule 2 against the flat surface 7 of the transverse body 6.

Figure 15:
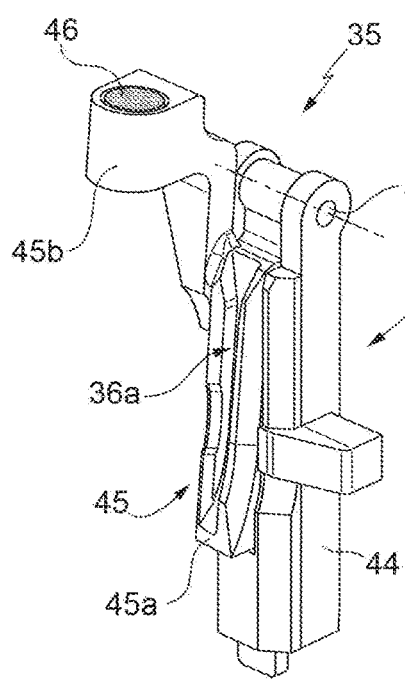
FIGS. 15 and 16 show, in a perspective view, a detail of the brewing device of FIG. 1 arranged in respective operating configurations corresponding to the operating arrangements shown in FIG. 13 and, respectively, in FIG. 14.
Figure 16:
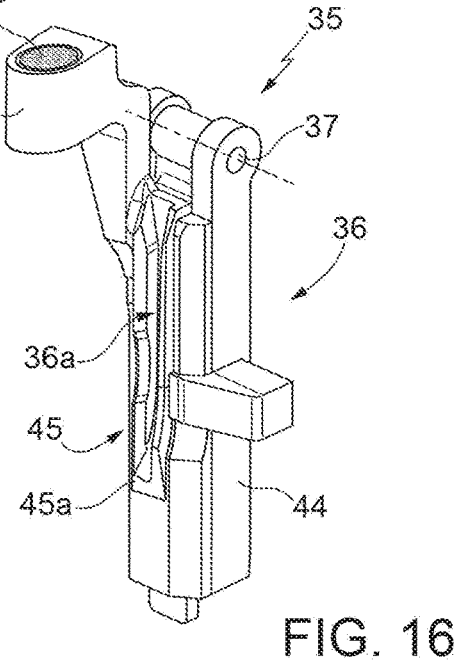

As shown in FIGS. 15 and 16, the jaws 36 are provided with respective grooves 36a, lying on a plane perpendicular to the longitudinal axis 5 and closed at the bottom by a curved portion to define a seat designed to receive from above the flange of the capsule 2 from above and to hold it in the loading position.

Moreover, when the cup-shaped body 8 moves back, the jaws 36 are configured to engage the face of the flange opposite the one facing the transverse body 6 to prevent the capsule 2 from moving back together with the cup-shaped body 8 and therefore cause the capsule 2 to progressively come out from the cup-shaped body 8. Once completely extracted from the cup-shaped body 8, the exhausted capsule 2 has no further support and falls under the effect of gravity.

Figure 13:
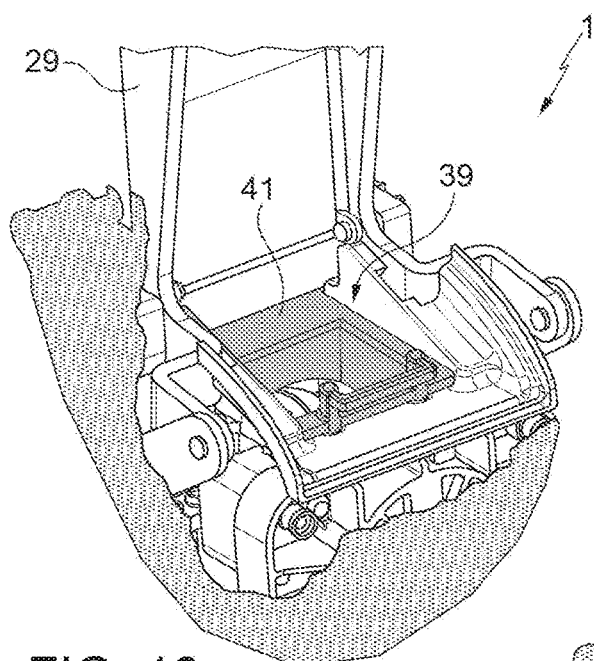
FIGS. 13 and 14 show, in a perspective view and with parts removed, the brewing device of FIG. 1 arranged in the operating arrangement of FIG. 11 and, respectively, of FIG. 12.
Figure 14:
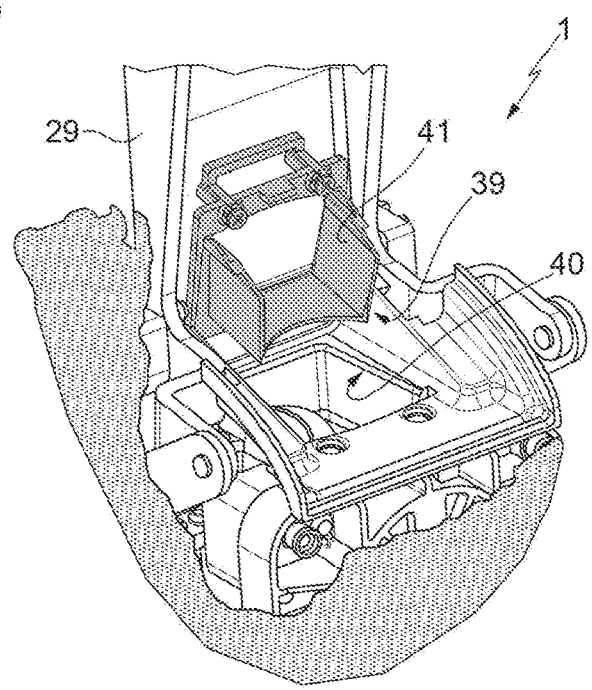

As shown in FIGS. 13 and 14, the brewing device 1 further comprises a loading device 39, whose function is receiving a new capsule 2 and guiding the free fall of the capsule 2 to the retaining device 35. Preferably, the loading device 39 is shaped so as to allow the capsule 2 to be inserted into the brewing device 1 only if the capsule is arranged according to a determined orientation, namely with its longitudinal axis substantially parallel to the longitudinal axis 5 and with its perforable membrane facing the transverse body 6.

In order to allow the correctly oriented insertion of both the smaller capsules 2A and the larger capsules 2B, the loading device 39 comprises an opening 40, which is provided at the top of the brewing device 1 under the cover 29 and is shaped and sized to receive with relative accuracy a larger capsule 2B having the aforementioned orientation. The loading device 39 further comprises a reducer/adapter 41, which comprises an annular element designed to engage the opening 40 with relative accuracy so as to define an opening shaped and sized to receive a smaller capsule 2A arranged according to the aforementioned orientation.

According to the preferred embodiment shown in FIGS. 1 to 10, the reducer/adapter 41 is mounted on the brewing device 1 so that, when the cover 29 is lowered, it engages the opening 40 and is arranged over the path of the cup-shaped body 8 so as not to hinder the movement of this latter towards the transverse body 6 during the closing phase of the brewing device 1.

However, when the cover 29 is raised, the reducer/adapter 41 can take two configurations depending on whether it has to be loaded a capsule 2A or a capsule 2B. In particular, the reducer/adapter 41 can take a lowered position (FIG. 13), in which it engages the opening 40 and allows the precise insertion of the capsule 2A, and a raised position, in which it is overturned towards the cover 29 and is fastened to this latter by means of an easily removable coupling so as not to interfere with the opening 40 and allow the introduction of a capsule 2B into it.

Preferably, the cover 29 is mounted on the brewing device 1 to rotate about an axis transverse to the longitudinal axis 5 and the reducer/adapter 41 is mounted on the brewing device 1 to rotate about an axis parallel to the hinge axis of the cover 29 to swing between the raised and the lowered position. According to a preferred embodiment, the hinge axis of the reducer/adapter 41 coincides with the hinge axis of the cover 29.

The removable coupling that allows the reducer/adapter 41 to be fastened to the cover 29 is configured not only to move the reducer/adapter 41 from its raised position to its lowered position, but also to allow the reducer/adapter 41, when is coupled to the cover 29, to follow the cover 29 in its opening and closing movements.

According to the preferred embodiment of the shown embodiment (FIGS. 2 and 6), the rapidly removable coupling between the reducer/adapter 41 and the cover 29 can comprise, as shown in FIGS. 1, 2, 4 and 6-9, a tooth 42 carried by the reducer/adapter 41 and adapted to slidably engage a slot 43 formed on the cover 29. The user should just transversely disengage the tooth 42 from the slot 43 to remove the coupling.

Any other suitable coupling system can be used to removably connect the reducer/adapter 41 to the cover 29, for example a magnetic coupling, as in the example shown in FIGS. 11 and 12.

In addition to act as capsule inlet channel adapter, the reducer/adapter 41 further serves to modify the configuration of the retaining device 35 so that this latter is capable to receive and hold capsules of both sizes. In fact, since, normally, the flange diameter of the caps 2A is smaller than the diameter of the flange of the cap 2B, it is necessary that the jaws 36 of the retaining device 35 define therebetween a seat having a size adequate to the size of the flange of the capsule in-use in order to hold the capsule in a determined position with respect to the cup-shaped body 8 and to the transverse body 6.

For this purpose, the reducer/adapter 41 is configured to interact with the jaws 36, when the reducer/adapter 41 is inserted in the opening 40 and the jaws 36 are arranged in the aforementioned closed configuration, to move the jaws 36 from a normal closed arrangement, wherein the seat defined by the grooves 36a of the jaws 36 is suitable to receive the flange of a larger capsule 2B, to a closely-spaced closed arrangement, wherein the seat defined by the grooves 36a of the jaws 36 is suitable to receive the flange of a smaller capsule 2A.

For this purpose, as shown in FIGS. 15 and 16, each jaw 36 comprises an outer portion 44 hinged, at its upper end, on the relative pin 37, and an inner portion 45 also hinged on the pin 37 and being fitted, on the side facing the inner portion 45 of the other jaw 36, with the groove 36a of the respective jaw 36.

The spring 38 of each jaw 36 is interposed between the frame 9 and the respective outer portion 44 to bring the jaw 36 back from the open configuration to the loading configuration when the cup-shaped body 8 moves back from the advanced position at the end of the dispensing step.

Each inner portion 45 is shaped like a rocker arm hinged to the pin 37 and comprises an arm 45a, which extends downwards from the pin 37 and carries the groove 36a, and an arm 45b opposed to the arm 45a and provided with a magnet 46 at its free end.

The arms 45b are arranged so that, when the cover 29 is raised and the reducer/adapter 41 is inserted into the opening 40, to load a capsule 2A, the magnets 46 cooperate with respective ferromagnetic elements 47 carried by the reducer/ adapter 41 and cause the inner portions 45 to rotate, in opposite directions, about the respective pins 37 so as to bring the arms 45b, and therefore the grooves 36a, closer together, and reduce the width of the seat defined by the grooves 36a enough to receive the flange of the capsule 2A and hold this latter in the loading position.

It should be noted that, although in the shown embodiment the jaws 36 are mounted to rotate about pins 37 (e.g., stationary pivots) parallel to the longitudinal axis 5 of the brewing device 1, the above is also applicable, with appropriate modifications, to an embodiment (not shown) in which the jaws 36 are rotatable about respective stationary pins transverse to the longitudinal axis 5 to swing between the closing position and the open position on a plane parallel to, and preferably passing through, the longitudinal axis 5.

Finally, the brewing device 1 preferably comprises a control device (not shown) suitable to recognize which capsule 2 is in-use and accordingly control the infusion parameters.

The control device comprises a control unit and a pair of micro-switches arranged in stationary positions under the cup-shaped body 8 and mutually aligned in a direction parallel to the longitudinal axis. The control device further comprises an actuator, integral with the inner cup 16 of the cup-shaped body 8 and arranged so as to operate, during operation, one or the other of the two switches according to the position of the inner cup 16 with respect to the outer cup 13 when the brewing device 1 has reached the closing position.

For example, if a capsule 2A is used, the inner cup will be closer to the transverse body 6 than when a capsule 2B is used and, therefore, the actuator will activate the micro-switch that is closest to the transverse body 6. If instead a capsule 2B is used, the inner cup 16 will be moved back towards the bottom of the outer cup 13 and therefore will be further away from the transverse body 6 than when a capsule 2A is used and then the actuator member will activate the micro-switch that is furthest from the transverse body 6.

The invention claimed is:

1. A brewing device for producing a beverage from two differently sized capsules, the brewing device comprising:
    two parts opposite and mutually movable between an open or loading position in which a capsule is loadable between the two parts, and a closing or brewing position in which the two parts are coupled and define therebetween a brewing chamber housing the capsule;
    one of the two parts of the brewing device includes a cup-shaped body including a first portion and a second portion defining therebetween a seat designed to receive the capsule during the movement of the cup-shaped body towards said closing position; the second portion is designed to slide with respect to the first portion between a smaller seat position, in which the seat is sized to house a smaller capsule, and a larger seat position, in which the seat is sized to house a larger capsule; and
    an actuator configured to move the cup-shaped body from the open position to the closing position, and vice versa;
    wherein the first portion includes an outer cup, which includes a side wall and a bottom wall, and the second portion comprises an inner cup, which is arranged inside the outer cup and comprises a side wall slidably coupled to the side wall of the outer cup, and a bottom wall; the inner cup is normally arranged in an extracted position, in which the inner cup and the outer cup define therebetween said smaller seat position, and is mounted to slide inside the outer cup, as a result of the interaction of the inner cup with the larger capsule during the movement of the cup-shaped body towards the closing position, so as to move from the extracted position to a retracted position, in which the inner cup and the outer cup define therebetween said larger seat position;
    wherein the actuator is configured to keep the outer cup still in the closing position and include a blocking device configured to define, in the closing position, an axial block for the inner cup only when, in the closing position, the inner cup is arranged in the extracted position or smaller seat position, so as to prevent the inner cup from backwardly moving towards the bottom wall of the outer cup under the thrust of a pressurized fluid injected in the smaller capsule; and
    wherein the outer cup and the inner cup are so sized that, when, in the closing position, the inner cup is in its retracted position or larger seat position, the bottom wall of the inner cup abuts against the bottom wall of the outer cup so as to prevent the inner cup from backwardly moving under the thrust of the pressurized fluid injected in the larger capsule; and
    wherein the blocking device is configured such that a dedicated actuation device is not required for the blocking device to become operative, and the blocking device is automatically activated when the seat houses the smaller capsule and is not active when the seat houses a larger capsule.

2. The brewing device of claim 1, wherein the blocking device is normally arranged in a blocking configuration in which the blocking device is able to define said axial block with respect to the inner cup and is movable from the blocking configuration to an unblocking configuration as a result of the interaction with the second portion when the inner cup moves from the extracted position or smaller seat position to the retracted position or larger seat position when the cup-shaped body moves towards the closing position.

3. The brewing device of claim 2, wherein the second portion includes an appendix, which extends from the bottom wall of the inner cup through and beyond a bottom wall of the outer cup and is arranged to interact with the blocking device when the inner cup moves from the extracted position or smaller seat position to the retracted position or larger seat position during the movement of the cup-shaped body towards the closing position, thus moving the blocking device from the normal blocking configuration to the unblocking configuration against the action of an elastic member.

4. The brewing device of claim 1, wherein the actuator includes a linkage including a crank-connecting rod mechanism to move the cup-shaped body from and to the closing position; the blocking device is mounted on a connecting rod of the crank-connecting rod mechanism and is configured to form an axial shoulder engaged by the second portion when the cup-shaped body is in the closing position and the inner cup is in the extracted position.

5. The brewing device of claim 1, wherein the outer cup has an axially symmetrical axis and is provided with a free edge; and the inner cup is coaxial to the outer cup and has a bottom wall; the seat having a depth that is variable based on the position of the inner cup with respect to the outer cup and is equal to an axial distance between the free edge of the outer cup and the bottom wall of the inner cup.

6. The brewing device of claim 5, wherein the inner cup is kept in the normal extracted position or smaller seat position by an elastic member arranged between the outer cup and the inner cup.

* * * * *